(12) United States Patent
You et al.

(10) Patent No.: US 10,583,380 B2
(45) Date of Patent: Mar. 10, 2020

(54) WATER PURIFYING APPARATUS AND REFRIGERATOR

(71) Applicant: LG ELECTRONICS INC., Seoul (KR)

(72) Inventors: Jimin You, Seoul (KR); Uison Hwang, Seoul (KR); Gyeonghwan Kweon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 448 days.

(21) Appl. No.: 15/445,525

(22) Filed: Feb. 28, 2017

(65) Prior Publication Data

US 2017/0282105 A1 Oct. 5, 2017

(30) Foreign Application Priority Data

Mar. 29, 2016 (KR) .................. 10-2016-0037995

(51) Int. Cl.
*B01D 35/30* (2006.01)
*F25D 23/12* (2006.01)
*B01D 29/52* (2006.01)
*F25D 11/02* (2006.01)
*F25D 23/02* (2006.01)

(52) U.S. Cl.
CPC .......... *B01D 35/306* (2013.01); *B01D 29/52* (2013.01); *B01D 35/30* (2013.01); *F25D 11/02* (2013.01);
(Continued)

(58) Field of Classification Search
CPC .. C02F 1/003; C02F 2307/10; C02F 2307/12; B01D 35/30; B01D 35/301; B01D 35/303; B01D 35/306; B01D 35/12; B01D 29/50; B01D 29/52; B01D 27/10; B01D 27/106; B01D 27/108; B01D 27/14; B01D 27/142; B01D 2201/162; B01D 2201/4038;
(Continued)

(56) References Cited

U.S. PATENT DOCUMENTS 3,985,652 A * 10/1976 Cooper .................. B01D 35/02
210/97
D783,774 S * 4/2017 Costantini .................... D23/209
(Continued)

FOREIGN PATENT DOCUMENTS

EP 2 908 075 A1 8/2015
JP 2001-259378 A 9/2001
(Continued)

*Primary Examiner* — David C Mellon
(74) *Attorney, Agent, or Firm* — Dentons US LLP

(57) ABSTRACT

A water purifying apparatus includes: a plurality of filters purifying and discharging introduced water along flow paths formed therein; a plurality of heads to which the plurality of filters are individually mounted to be detachable, the plurality of heads each having an inlet part and an outlet part, through which water is introduced and discharged; a mounting member to which the plurality of heads are mounted in parallel, the mounting member having a rotation supporting part that rotatably supports the head, and the rotation supporting part being formed recessed such that the inlet part and the outlet part are accommodated therein; and a connecting cap mounted on the rotation supporting part to connect the inlet part and the outlet part to communicate with each other.

20 Claims, 10 Drawing Sheets

(52) U.S. Cl.
CPC ............ *F25D 23/028* (2013.01); *F25D 23/12* (2013.01); *F25D 23/126* (2013.01); *B01D 2201/302* (2013.01); *B01D 2201/36* (2013.01); *F25D 2323/021* (2013.01); *F25D 2323/121* (2013.01)

(58) Field of Classification Search
CPC ........ B01D 2201/40; B01D 2201/4007; B01D 2201/4015; B01D 2201/4023; B01D 2201/4046; B01D 2201/4053; B01D 2201/4061
See application file for complete search history.

(56) References Cited

U.S. PATENT DOCUMENTS

| | | |
|---|---|---|
| 2003/0168394 A1 | 9/2003 | Gill |
| 2006/0213821 A1* | 9/2006 | Choi ...................... B01D 35/30 210/136 |
| 2008/0029452 A1* | 2/2008 | Lin ...................... B01D 35/303 210/463 |
| 2009/0289003 A1* | 11/2009 | Tsai ...................... B01D 35/301 210/232 |
| 2011/0120928 A1 | 5/2011 | Schmitt |
| 2016/0136547 A1 | 5/2016 | Nuss |
| 2017/0350641 A1* | 12/2017 | Park ...................... F25D 23/126 |

FOREIGN PATENT DOCUMENTS

| | | |
|---|---|---|
| JP | 2005-518934 A | 6/2005 |
| JP | 2006-082034 A | 3/2006 |
| JP | 2007-289888 A | 11/2007 |
| KR | 10-1069736 B1 | 10/2011 |
| KR | 10-1478965 B1 | 1/2015 |
| KR | 10-2015-0094904 A | 8/2015 |
| KR | 10-2016-0022709 A | 3/2016 |

* cited by examiner

WATER PURIFYING APPARATUS AND REFRIGERATOR

CROSS-REFERENCE TO RELATED APPLICATION

This application claims priority under 35 U.S.C. 119 and 35 U.S.C. 365 to Korean Patent Application No. 10-2016-0037995 filed on Mar. 29, 2016 in Korea, the entire contents of which is hereby incorporated by reference in its entirety.

BACKGROUND

In general, a water purifying apparatus is used to purify water using a filter or a filtering material, and includes an apparatus that purifies water from a water pipe or tank.

A representative example of the water purifying apparatus that supplies drinkable water is a water purifier. Recently, the entire or a portion of such a water purifying apparatus has been provided even in a refrigerator to be supplied with purified water through the refrigerator or make ice using the purified water.

In a refrigerator having a water purifying apparatus, it is necessary to replace or check a filter constituting the water purifying apparatus. To this end, the filter is configured to be detachable. In addition, the water purifying apparatus may have a structure in which a plurality of filters are disposed in parallel, thereby simultaneously achieving improved water purifying performance and a water purifying method having various functions.

Korean Patent Publication No. 10-2016-0022709 discloses a filter connector for a water purifier, which has a structure in which a plurality of filters are disposed in parallel, a tubular main body connecting part connects between filter mounting parts disposed in parallel.

However, in a typical filter connector having a structure in which a main body connecting part is fixed to filter mounting parts disposed at both sides thereof, when a force is applied to the filter mounting part to attach or detach a filter, the main body connecting part may break or separate from the filter mounting parts.

SUMMARY

Embodiments provide a water purifying apparatus that enables a rotatably mounted head to firmly maintain a mounting state and a refrigerator having the water purifying apparatus.

Embodiments also provide a water purifying apparatus that enables a plurality of rotatable heads to be easily fixed and mounted and a refrigerator having the water purifying apparatus.

According to one embodiment of the invention, a water purifying apparatus includes a plurality of filters purifying and discharging introduced water along flow paths formed therein; a plurality of heads to which the plurality of filters are individually mounted to be detachable, the plurality of heads each having an inlet part through which water is introduced and an outlet part through which water is discharged; a mounting member to which the plurality of heads are mounted in parallel, the mounting member having a rotation supporting part that rotatably supports the head and the rotation supporting part formed recessed such that the inlet part and the outlet part are accommodated therein; and a connecting cap mounted on the rotation supporting part to connect the inlet part and the outlet part to communicate with each other, wherein the rotation supporting part includes a cap fixing part for fixing the connecting cap, wherein the connecting cap includes: a flow path part connected to the inlet part and the outlet part; a restricting part extending from the flow path part to be elastically deformed, the restricting part being fixed to the cap fixing part; and a cover part extending from the flow path part, the cover part covering the inlet and outlet parts of the head in a state in which the restricting part is fixed to the cap fixing part.

In another embodiment of the invention, a water purifying apparatus includes a plurality of filters purifying and discharging introduced water along flow paths formed therein; a plurality of heads to which the plurality of filters are individually mounted to be detachable, the plurality of heads each having an inlet part through which water is introduced and an outlet part through which water is discharged; a mounting member to which the plurality of heads are mounted in parallel, the mounting member having a rotation supporting part that rotatably supports the head, and the rotation supporting part being formed recessed such that the inlet part and the outlet part are accommodated therein; and a connecting cap mounted on the rotation supporting part to connect the inlet part and the outlet part to each other, wherein the connecting cap includes: a flow path part connected to the inlet part and the outlet part; and a cover part extending from the flow path part, the cover part having a rounded shielding plate that covers the flow path part and the inlet and outlet parts of the head in a state in which the connecting cap is fixed to the rotation supporting part.

In yet another embodiment of the invention, a refrigerator includes: a cabinet forming a storage space; a door that opens and close the cabinet; a water purifying apparatus provided in the storage space, the water purifying apparatus purifying supplied water; and a dispenser provided at the door to discharge the water purified in the water purifying apparatus, wherein the water purifying apparatus includes: a plurality of filters purifying and discharging introduced water along flow paths being formed therein; a plurality of heads to which the plurality of filters are individually mounted to be detachable, the plurality of heads each having an inlet part through which water is introduced and an outlet part through which water is discharged; a mounting member to which the plurality of heads are mounted in parallel, the mounting member having a rotation supporting part that rotatably supports the head, and the rotation supporting part being formed recessed such that the inlet part and the outlet part are accommodated therein; and a connecting cap mounted on the rotation supporting part to connect the inlet part and the outlet part to communicate with each other, wherein the rotation supporting part includes a cap fixing part for fixing the connecting cap, wherein the connecting cap includes: a flow path part connected to the inlet part and the outlet part; a restricting part extending from the flow path part to be elastically deformed, the restricting part being fixed to the cap fixing part; and a cover part extending from the flow path part, the cover part covering the inlet and outlet parts of the head in a state in which the restricting part is fixed to the cap fixing part.

The details of one or more embodiments are set forth in the accompanying drawings and the description below. Other features will be apparent from the description and drawings, and from the claims.

DETAILED DESCRIPTION OF THE EMBODIMENTS

Figure 1:
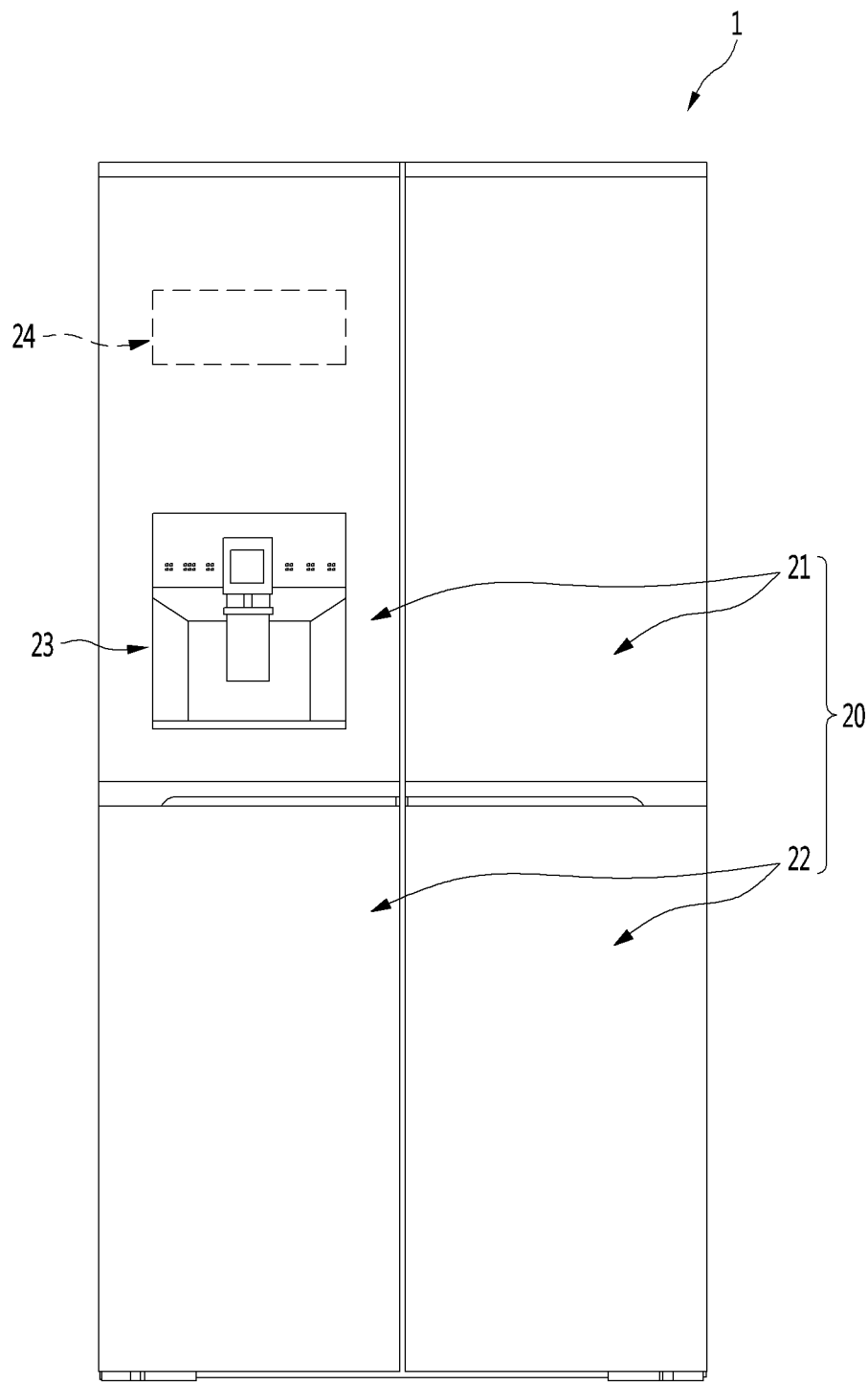
FIG. 1 is a front view of a refrigerator according to an embodiment of the invention.
Figure 2:
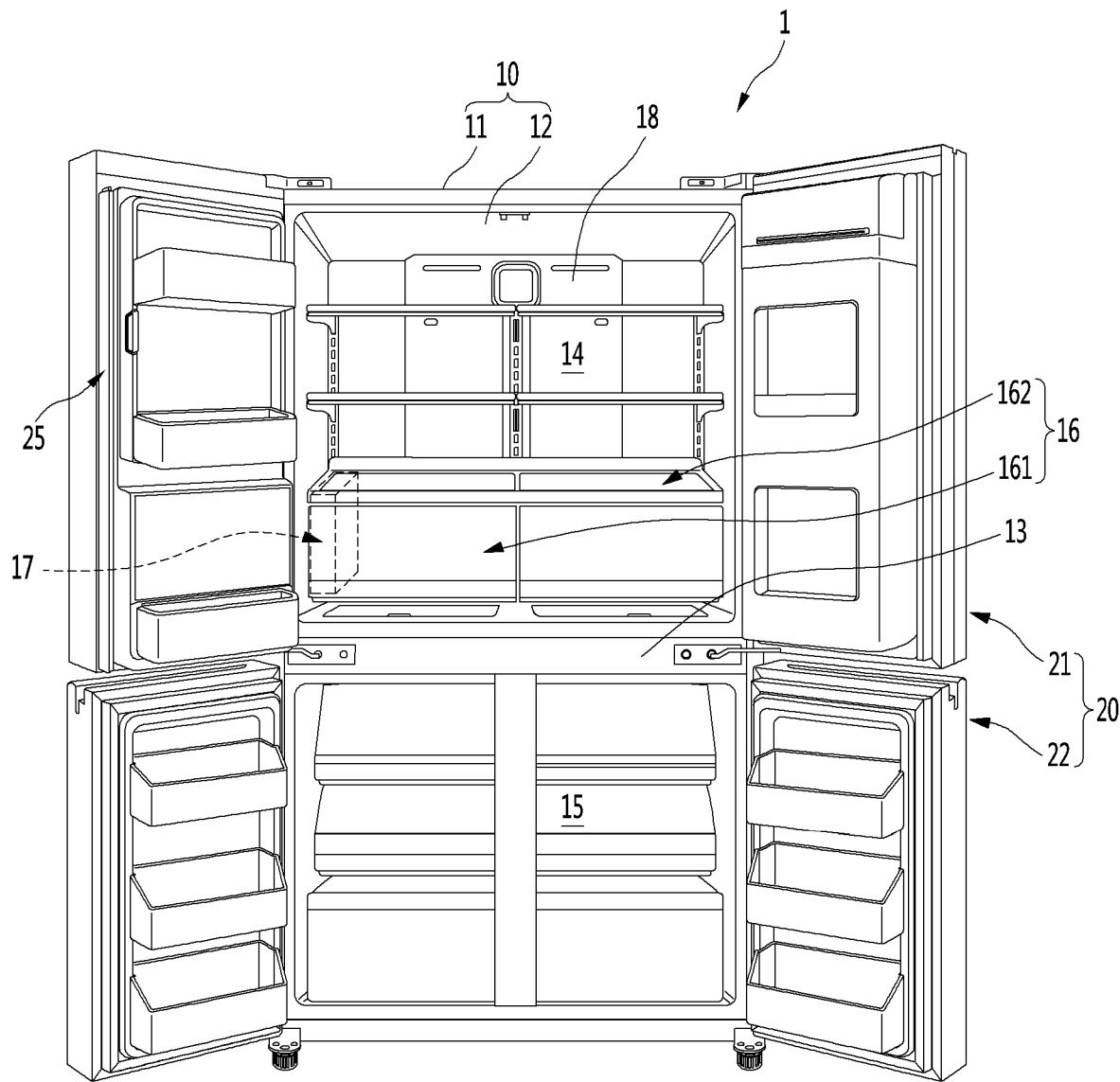
FIG. 2 is a front view showing a state in which a door of the refrigerator is opened.

FIG. 1 is a front view of a refrigerator according to an embodiment. FIG. 2 is a front view illustrating a state in which a door of the refrigerator is opened.

As shown in the drawings, an external appearance of the refrigerator 1 according to the embodiment may be formed by a cabinet 10 that forms a storage space and a door 20 that opens and closes the storage space of the cabinet 10.

The cabinet 10 may include an outer case 11 made of a metallic material, which forms an outer surface thereof, and an inner case 12 made of a resin material, which is coupled to the outer case 11 and forms a storage space in the refrigerator 1. In addition, an insulating material may be filled between the outer case 11 and the inner case 12 to insulate the space in the refrigerator 1.

The storage space is divided into upper and lower compartments based on a barrier 13, and may include an upper refrigerating compartment 14 and a lower freezing compartment 15. In addition, the freezing compartment 15 may be configured to be further divided into left and right compartments. It will be apparent that the storage space may be divided into left and right compartments based on the barrier 13.

The door 20 may include a refrigerating compartment door 21 and a freezing compartment door 22, which independently open and close the refrigerating compartment 14 and the freezing compartment 15, respectively.

Both of the refrigerating compartment door 21 and the freezing compartment door 22 may open and close the refrigerating compartment 14 and the freezing compartment 15 by rotation thereof. To this end, both of the refrigerating compartment door and the freezing compartment door 22 may be rotatably connected to the cabinet 10 by door hinges 26 (see FIG. 3). In addition, the refrigerating compartment door 21 may be configured as a French type door configured such that a pair of doors independently rotate at both left and right sides.

A dispenser 23 and an icemaker 24 may be provided at any one of the pair of refrigerating compartment doors 21.

The dispenser 23 is provided at a front surface of the refrigerating compartment door 21, and enables a user to take out water or ice by manipulating the dispenser 23 from the outside. In addition, an ice making compartment 25 is provided above the dispenser 23. The ice making compartment 25 is a heat insulating space in which ice is made and stored, and the icemaker 24 is accommodated in the ice making compartment 25. The ice making compartment 25 may be opened/closed by a separate door. In addition, although not shown in the drawings, the ice making compartment 25 may communicate with the freezing compartment 15 by a cool air duct in a state in which the refrigerating compartment door 21 is closed to be supplied with cool air for ice making from a freezing compartment evaporator (not shown).

Meanwhile, a plurality of shelves and drawers for storing foods may be provided in the refrigerating compartment 14. Particularly, a drawer assembly 16 may be provided on a bottom surface of the refrigerating compartment 14. The drawer assembly 16 may include a drawer 161 provided to be slidable and a table 162 that shields a top surface of the drawer 161.

The drawer assembly 16 may be configured such that the inside thereof can be seen therethrough, and a main water tank 34 (see FIG. 3) provided at a rear side of the refrigerating compartment 14 may be shielded by the drawer 161. In addition, a water purifying apparatus 17 that purifies supplied water and supplies the purified water to the dispenser 23 and the ice maker 24 may be provided at a side of the drawer assembly 16. The water purifying apparatus 17 may be disposed between a storage space of the drawer 161 and a wall surface. The water purifying apparatus 17 may be shielded by a front surface of the drawer 161. Thus, the water purifying apparatus 17 is not exposed to the outside in a state in which the drawer 161 is closed, but opened to the outside in a state in which the drawer 161 is withdrawn, so that access to the water purifying apparatus 17 is possible. The mounting position of the water purifying apparatus 17 is not limited to a side of the drawer 161, and the water purifying apparatus 17 may be provided in the refrigerating compartment 14 or an area of the refrigerating compartment 14 including the refrigerating compartment door 21.

A plurality of shelves having a cantilever structure may be attachably/detachably provided above the drawer assembly 16 such that their heights are adjustable. In addition, a main duct 18 is provided on a rear surface of the refrigerating compartment 14, and cool air generated in an evaporator (not shown) may be supplied to the inside of the refrigerating compartment 14 through a plurality of outlets formed in the main duct 18.

Figure 3:
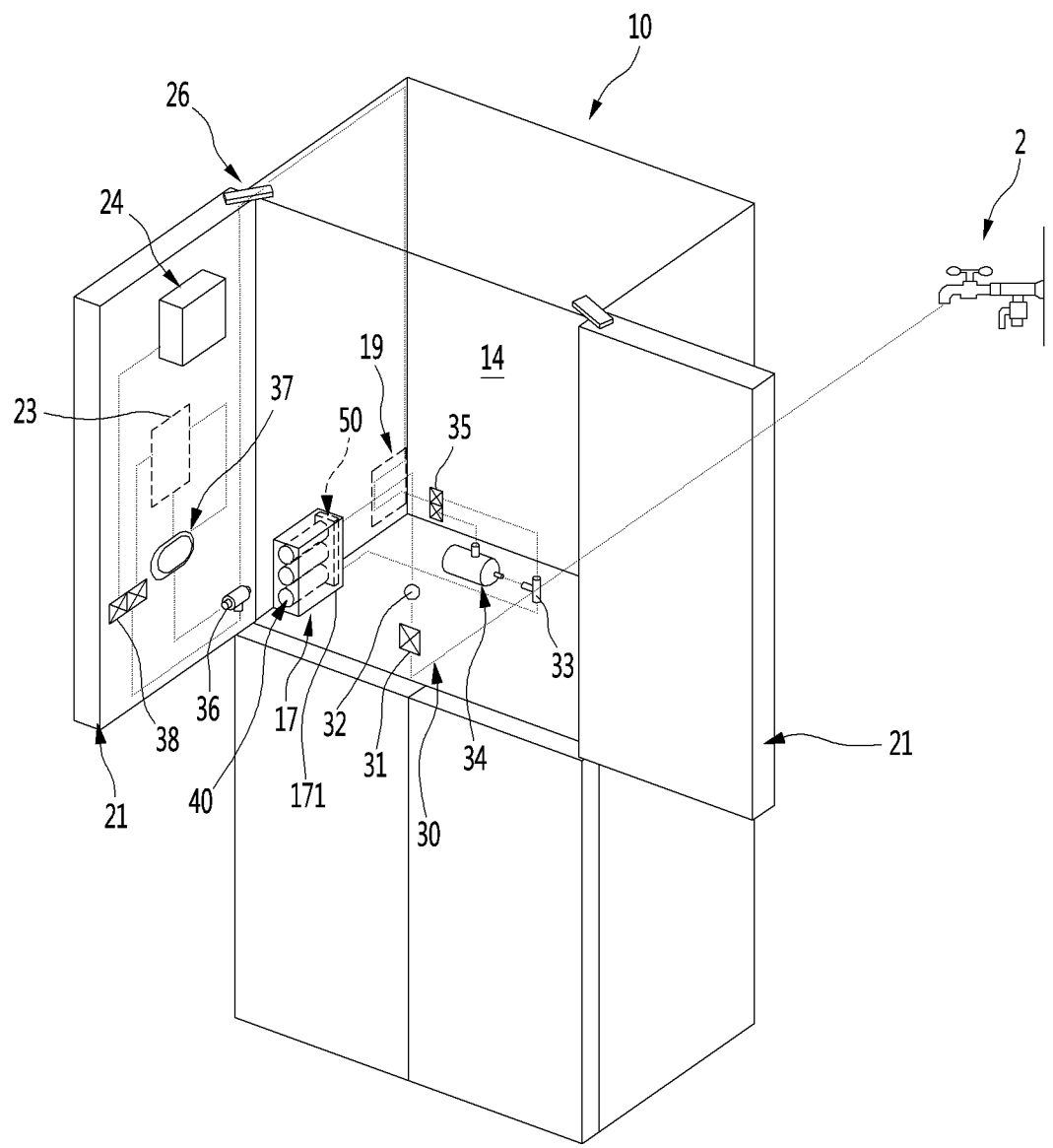
FIG. 3 is a view schematically showing a disposition structure of a water supply path of the refrigerator.

FIG. 3 is a view schematically showing a disposition structure of a water supply path of the refrigerator.

As shown in the drawing, the refrigerator 1 may include a water supply path 30 that purifies or cools water supplied from an external water supply source and then takes out water from the dispenser 23, or supplies the purified water to the dispenser 23 or the icemaker 24.

The water supply path 30 may be directly connected to a water supply source 2 such as a water pipe at the outside of the refrigerator, and be introduced into a space in the refrigerator through a tube guide 19 mounted in the cabinet 10 to be connected to an entrance of the water purifying apparatus 17 in the refrigerator.

In addition, a water supply valve 31 and a flow sensor 32 may be provided in the water supply path 30. If necessary, the flow sensor 32 may be integrally formed with the water supply valve 31.

The water supply path 30 may connect the water purifying apparatus 17 and a first branch tube 33 therethrough, and the water supply paths 30 branched from the first branch tube 33 may be connected to the main water tank 34 and a first branch valve 35.

The water supply path 30 connected to an exit of the first branch valve 35 may extend along a side wall at the inside of the cabinet 10 or a rear wall surface at the outside of the cabinet 10 through the tube guide 19 and then extend along a top surface of the cabinet 10, and head for the refrigerating compartment door 21 via the door hinge 26.

In addition, the water supply path of the refrigerating compartment door 21 may be branched by a second branch tube 36 to be connected to an entrance of a sub-water tank 37 and a second branch valve 38. The sub-water tank 37 may be connected to the dispenser 23 such that cooled water can be taken out through the dispenser 23.

In addition, exits of the second branch valve 38 may be respectively connected to the dispenser 23 and the ice maker 24 by the water supply path 30 to supply purified water to the dispenser 23 and the ice maker 24.

Water purified through the water purifying apparatus 17 may be cooled to be supplied to the dispenser 23, or may be supplied to the dispenser 23 or the ice maker 24 in a state in which the water is not cooled but purified.

In addition, the water purifying apparatus 17 may include a plurality of filters 40 for purifying water supplied thereto, and a head unit 50 coupled to each of the plurality of filters 40, the head unit 50 being connected to a flow path along which water flows. Also, the water purifying apparatus 17 may further include a case 171 in which the filters 40 and the head unit 50 are accommodated.

Figure 4:
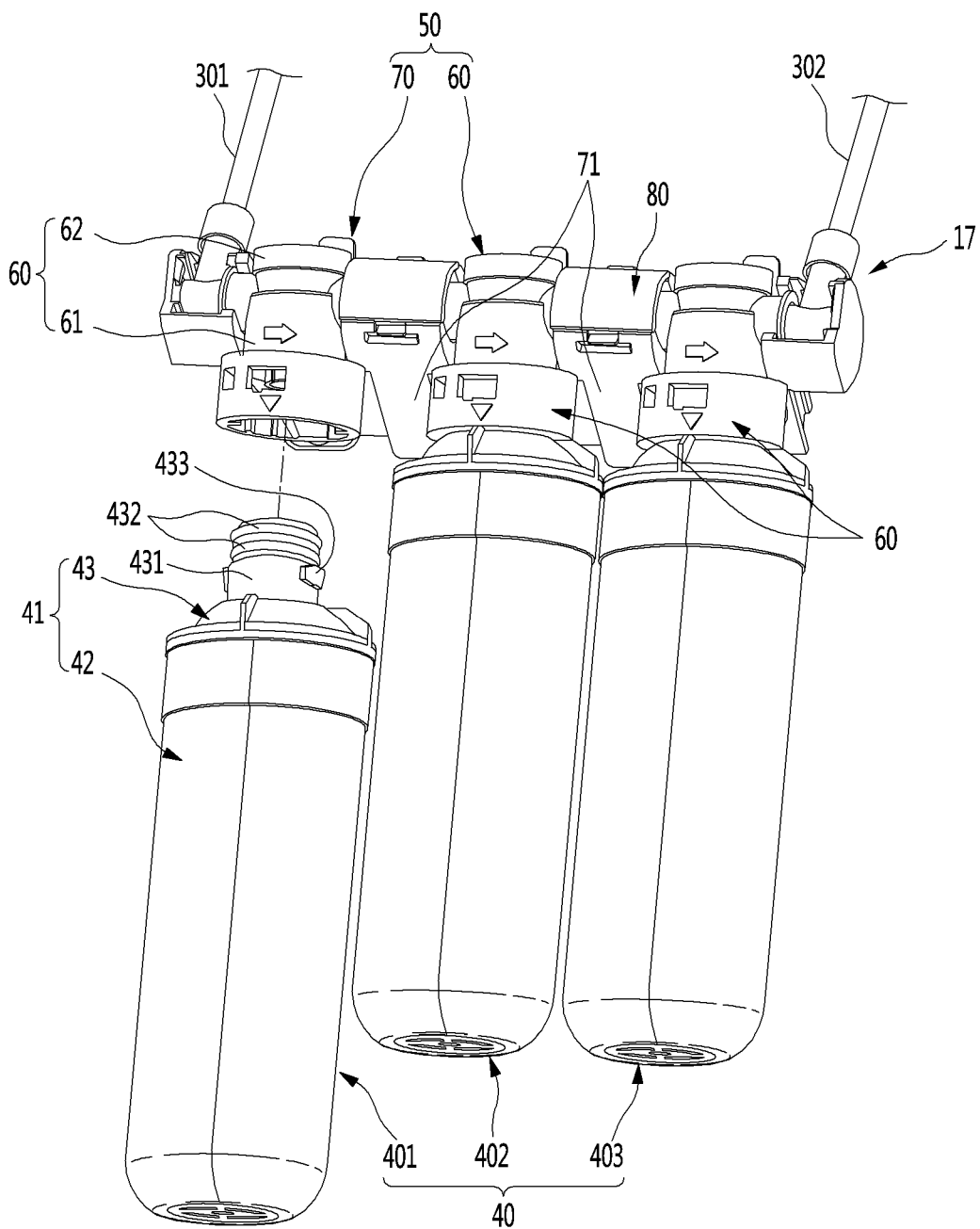
FIG. 4 is a perspective view showing a structure of a water purifying apparatus.

FIG. 4 is a perspective view showing a structure of the water purifying apparatus.

As shown in the drawing, the water purifying apparatus 17 may include a plurality of filters 40 and a head unit 50. The plurality of filters 40 may purify water passing through the water purifying apparatus 17 by combining a first filter 401 connected to an inlet side of the head unit 50, a third filter 403 connected to an outlet side of the head unit 50, and a second filter 402 disposed between the first filter 401 and the third filter 403.

The first filter 401 may be a pre-carbon filter, the second filter 402 may be a membrane filter, and the third filter 403 may be a post-carbon filter.

The number and kind of the filters 40 are not limited, but a plurality of different kinds of functional filters may be applied so as to achieve a number of filters accommodatable in the water purifying apparatus 17 and efficient water purification.

The filter 40 may be formed in a cylindrical shape, and the external appearance of the filter 40 may be formed by a housing 41. The housing 41 may include a housing body 42 that accommodates a filtering member for water purification therein, and a housing cap 43 coupled to an opened upper end of the housing body 42 to form an upper portion of the housing 41.

The housing cap 43 may include a filter insertion part 431 capable of being inserted into an opened bottom surface of a head 60. In addition, at least one O-ring 432 may be provided at an upper end of the filter insertion part 431. The O-ring 432 may be in contact with an inner surface of the head 60 to be airtight, thereby preventing water leakage.

In addition, a coupling projection 433 may be further formed at the filter insertion part 431. The coupling projection 433 may be inserted along a coupling groove 631 (see FIG. 5) formed in the inner surface of the head 60 when an upper portion of the filter 40 is inserted into the inside of the head 60.

The coupling groove 631 and the coupling projection 433 are coupled to each other when the filter 40 is mounted, and the filter 40 can maintain a state in which the filter 40 is fixedly mounted in the head 60. Further, in the state in which the filter 40 and the head 60 are completely coupled to each other, flow paths of the filter 40 and the head 60 are connected to each other, so that water can flow between the filter 40 and the head 60.

The head unit 50 may include a plurality of heads 60 to which the respective filters 40 are coupled, and a mounting member 70 to which each of the plurality of heads 60 is rotatably mounted. An inlet tube 301 through which original water is introduced may be connected to one end of the mounting member 70, and an outlet tube 302 through which purified water is discharged may be connected to the other end of the mounting member 70.

Each of the plurality of heads 60 may be independently rotated in a state in which the plurality of heads 60 are mounted to the mounting member 70. The plurality of heads 60 may be configured such that their flow paths are connected to each other, and the original water introduced through the inlet tube 301 may be purified by passing through all of the filters 40 and then discharged through the outlet tube 302.

The mounting member 70 may include a rotation supporting part 71 that rotatably supports both ends of the head 60. The rotation supporting part 71 may also be provided between the plurality of heads 60, and a connecting cap 80 may be mounted on the rotation supporting part 71.

The connecting cap 80 may be fixedly mounted on the rotation supporting part 71 to form a portion of the external appearance of the mounting member 70. Also, the connecting cap may connect flow paths between two adjacent head 60. The connecting cap 80 may fix the head 60 such that the head 60 is not separated from the mounting member 70 but maintains the fixed state even in a manipulation of rotating the head 60.

The head 60 may include a head body 61 into which an upper end of the filter is inserted and fixed, and a head cap 62 that covers the head body 61.

The head 60 may further include a shaft (see 90 of FIG. 9) accommodated in the head body 61, the shaft being connected to the upper end of the filter 40 to form a flow path along which water flows. The head cap 62 may shield a top surface of the head body 61 into which the shaft (see 90 of FIG. 9) is inserted.

The filter 40 may be fixedly mounted to the head 60 in a rotation manner. In a mounting process of the filter 40, flow paths of the filter 40 and the head 60 may be connected to each other at the inside of the head 60 such that water to be purified is supplied to the inside of the filter 40, and water purified in the filter 40 may be discharged to the head 60.

In addition, in a separation process of the filter 40, the flow path of the filter 40 may be blocked such that water is not leaked, and the flow path in the head 60 may be changed to pass through the head 60. That is, although the filter 40 is removed in a service operation such as replacement of the filter 40 or cleaning of flow paths or when a user intentionally removes the filter 40, water supplied through the inlet tube 301 may flow into the outlet tube 302 by passing through the head 60. Thus, the supply of water on the entire water supply path 30 can be performed without any pause, and the dispenser 23 and the ice maker 24 can be normally used.

The case 171 may be formed in various structures in which the filters 40 and the head unit 50 are accommodatable. The case 171 may have a structure in which at least a portion of the filters 40 and the head unit 50 is accommodated, as well as a structure in which the filters 40 and the head unit 50 are completely accommodated.

In addition, the case 171 may have various structures in which the case 171 is fixedly mounted at one side of the inside of the refrigerating compartment 14. If necessary, the case 171 may not be provided such that the mounting member 70 is directly mounted at one side of the inside of the refrigerating compartment 14.

Figure 5:
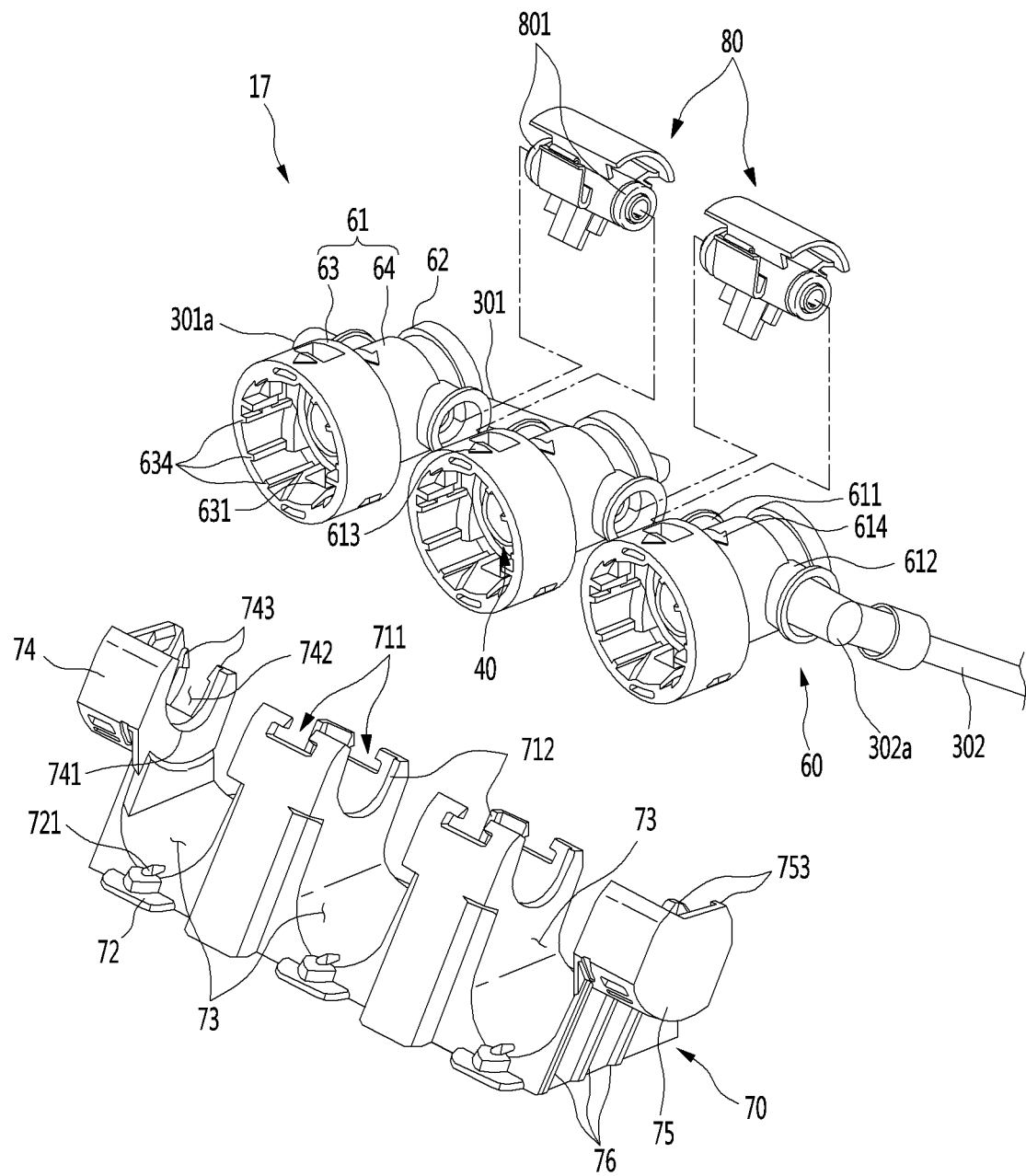
FIG. 5 is an exploded perspective view of the water purifying apparatus.

FIG. 5 is an exploded perspective view of the water purifying apparatus.

As shown in the drawing, the plurality of heads 60 coupled to the plurality of filters 40 may be rotatably mounted to the mounting member 70, and the mounting member 70 may connect between the plurality of heads 60.

The mounting member 70 may be entirely injection-molded with a plastic material, and has a structure capable of connecting the plurality of heads 60. Also, the mounting member 70 may be configured to sequentially connect the inlet tube 301, the outlet tube 302, and the plurality of heads 60.

In detail, a mounting part 72 is formed at the mounting member 70. The mounting part 72 may allow the mounting member 70 to be fixedly mounted to one wall surface in the case 171 or the refrigerator 1. The mounting part 72 may be formed to protrude from a lower end of the mounting member 70. In addition, a mounting hole 721 to which a fastening member such as a screw is fastened may be formed in the mounting part 72.

A head accommodating part 73 in which the head 60 is accommodated may be formed to be recessed in the mounting member 70. The head accommodating part 73 may be formed such that an upper portion of the head 60 is accommodated therein. Also, the head accommodating part 73 may be recessed to a depth in which the head 60 is rotatable by a predetermined angle in the top-bottom direction in the state in which the head 60 is mounted.

In addition, a plurality of head accommodating parts may be disposed to be spaced apart from each other at a predetermined distance, and the rotation supporting part 71 may be formed between two adjacent head accommodating parts 73. The rotation supporting part 71 may rotatably support both sides of the head 60. Simultaneously, the rotation supporting part 71 may allow a flow path connecting between the plurality of heads 60 to be disposed.

The rotation supporting part 71 may be formed to have a predetermined width. The rotation supporting part 71 may support an inlet part 611 and an outlet part 612 at both sides of the head 60. A top surface of the rotation supporting part 71 may be opened such that the inlet part 611, the outlet part 612, and the connecting cap 80 are mounted.

In addition, the rotation supporting part 71 may be formed rounded in a shape corresponding to those of the inlet part 611 and the outlet part 612 to be rotatable in a state in which the inlet part 611 and the outlet part 612 are mounted. In detail, openings 712 may be formed in both side surfaces of an upper end of the rotation supporting part 71, and lower ends of the openings 712 are formed rounded to rotatably support the inlet part 611 and the outlet part 612.

The rotation supporting part 71 is disposed between two adjacent heads 60, and an inlet part 611 of one head and an outlet part 612 of another head may be supported by one rotation supporting part 71.

The rotation supporting part 71 accommodates portions of the inlet part 611 and the outlet part 612. The rotation supporting part 71 may be formed to have a predetermined width such that the adjacent inlet and outlet parts 611 and 612 are disposed to be spaced apart from each other. In addition, the connecting cap 80 may be inserted between the inlet part 611 and the outlet part 612, and the adjacent inlet and outlet parts 611 and 612 may communicate with each other through the connecting cap 80.

The rotation supporting part 71 may further include a cap fixing part 711 for fixing the connecting cap 80. The connecting cap 80 may be fixed to the rotation supporting part 71 by the cap fixing part 711, and the cap fixing part 711 enables the head 60 to maintain a stable mounting state even in the manipulation of rotating the head 60. A structure of the cap fixing part 711 for fixing the connecting cap 80 will be described in more detail below.

In addition, an inlet tube connecting part 74 and an outlet tube connecting part 75 to which the inlet tube 301 and the outlet tube 302 are connected may be provided at both left and right side ends of the mounting member 70, respectively. The inlet tube connecting part 74 and the outlet tube connecting part 75 protrude sideward. The inlet tube connecting part 74 may allow an inlet tube fitting part 301*a* provided at an end portion of the inlet tube 301 to be accommodated therein, and the outlet tube connecting part 75 may allow an outlet tube fitting part 302*a* provided at an end portion of the outlet tube 302 to be accommodated therein.

The inlet tube fitting part 301*a* and the outlet tube fitting part 302*a* may be rotatably mounted to the inlet tube connecting part 74 and the outlet tube connecting part 75, respectively. In addition, the inlet tube fitting part 301*a* and the outlet tube fitting part 302*a* may be formed in a bent shape. One end of the inlet tube fitting part 301*a* may be rotatably connected to the inlet part 611 of the head 60, and the other end of the inlet tube fitting part 301*a* may extend rearward of the inlet tube connecting part 74. One end of the outlet tube fitting part 302*a* may be rotatably connected to the outlet part 612, and the other end of the outlet tube fitting part 302*a* may extend rearward of the outlet tube connecting part 75.

Side openings 741 and 751 opened toward the inlet and outlet parts 611 and 612 of the head 60 may be formed in the inlet tube connecting part 74 and the outlet tube connecting part 75, respectively. The inlet tube fitting part 301*a* and the outlet tube fitting part 302*a* may extend by passing through the side openings 741 and 751, respectively. The inlet tube fitting part 301*a* and the outlet tube fitting part 302*a* may be connected to the inlet part 611 and the outlet part 612, respectively.

In addition, the inlet and outlet parts 611 and 612 of the head 60, which are disposed at both sides of the mounting member 70, may be rotatably disposed at the inlet tube connecting part 74 and the outlet tube connecting part 75, respectively. That is, the inlet part 611 and the outlet part 612 may be mounted in the side openings 741 and 751, respectively, and the side openings 741 and 751 may be formed in the same shape as the opening 712 formed at both sides of the rotation supporting part 71.

Rear openings 742 and 752 which are vertically cut out may be formed at rear ends of the inlet tube connecting part 74 and the outlet tube connecting part 75, respectively, and the inlet tube fitting part 301*a* and the outlet tube fitting part 302*a* may extend rearward through the rear openings 742 and 752, respectively. The rear openings 742 and 752 may be vertically opened long, and a diameter of the rear openings 742 and 752 may be vertically formed longer than that of the inlet tube fitting part 301*a* and the outlet tube fitting part 302a such that the inlet tube fitting part 301a and the outlet tube fitting part 302a are rotatably formed in the top-bottom direction.

Restricting projections 743 and 753 protruding inward may be formed at upper ends of the rear openings 742 and 752, respectively. A distance between the restricting projections 743 and 753 may be formed slightly smaller than the diameter of the inlet tube fitting part 301a and the outlet tube fitting part 302a. In addition, upper surfaces of the restricting projections 743 and 753 may be formed to be inclined such that the inlet tube fitting part 301a and the outlet tube fitting part 302a are easily press-fitted into the rear openings 742 and 752, respectively. Thus, the inlet tube fitting part 301a and the outlet tube fitting part 302a are not arbitrarily separated inside the inlet tube connecting part 74 and the outlet tube connecting part 75, respectively. Further, the inlet tube fitting part 301a and the outlet tube fitting part 302a are rotatable using the inlet part 611 and the outlet part 612 as axes, respectively.

In addition, a reinforcing rib 76 may be formed at both left and right sides of the mounting member 70, which correspond to lower sides of the inlet tube connecting part 74 and the outlet tube connecting part 75. The reinforcing rib 76 may extend along a side of the mounting member 70, and a plurality of reinforcing ribs 76 may be disposed at a predetermined distance. Thus, deformation of the mounting member 70 can be prevented by the reinforcing rib 76, and the head 60 can be stably supported even in the manipulation of rotating the head 60.

The head 60 may be rotatably mounted to the mounting member 70 by the rotation supporting part 71. Thus, when the filter 40 is detached, a space for detaching the filter 40 can be ensured by performing a manipulation of rotating or tilting the head 60, and an operation of detaching the filter 40 can be more easily performed.

In addition, an insertion indicating part 613 that indicates an insertion position of the coupling projection 433 may be provided at an outer surface of the head body 41. The insertion indicating part 613 may be formed through printing, molding, or machining. The insertion indicating part 613 enables a user to recognize the position of the coupling groove 631, and facilitates alignment between the coupling groove 631 and the coupling projection 433.

In addition, a rotation indicating part 614 that indicates a rotating direction of the filter 40 may be further provided at the outer surface of the head body 61. The rotation indicating part 614 may also be formed through printing, molding, or machining. The rotation indicating part 614 enables a user to perform a manipulation of rotating the filter 40 in the correct direction such that the coupling projection 433 is coupled to the coupling groove 631 by moving along the inside of the coupling groove 631.

The head body 61 may include a lower body 63 and an upper body 64. The lower body 63 is a part into which the filter insertion part 431 is inserted and coupled, and a bottom surface of the lower body 63 is opened such that the filter 40 is accommodatable therethrough. In addition, the coupling groove 631 for allowing the coupling projection 433 to be inserted thereinto may be formed in the lower body 63.

A plurality of supporting ribs 634 for supporting the outside of the filter insertion part 431 may be formed at the circumference of an inner surface of the lower body 63 so as to prevent loosening of the filter 40 in the state in which the filter insertion part 431 is inserted.

The upper body 64 may be formed at an upper end of the lower body 63. The upper body 64 may have a smaller internal diameter than the lower body 63. The shaft 90 may be mounted to the inside of the upper body 64. The shaft 90 may be inserted through an opened top surface of the upper body 64, to be mounted to the inside of the upper body 64.

The inlet part 611 and the outlet part 612 are formed at both sides of the upper body 64 to protrude outward. In addition, each of the inlet part 611 and the outlet part 612 may be connected to the connecting cap 80. In this case, the inlet part 611 and the outlet part 612 may selectively communicate with a flow path formed by the shaft 90.

Thus, when the filter 40 is mounted, the shaft 90 enables purified water to flow by connecting flow paths between the filter 40 and the head 60. It will be apparent that a connection manner of flow paths by the shaft 90 and a conversion manner to a bypass flow path 91 (see FIG. 9) may be variously selected.

The head cap 62 shields the opened top surface of the upper body 64. The head cap 62 presses a top surface of the shaft 90 inserted into the opened top surface of the upper body 64 to maintain a state in which the shaft 90 is fixedly mounted to the inside of the upper body 64.

Meanwhile, the plurality of supporting ribs 634 may be formed at the inner surface of the lower body 63, and the outer surface of the filter insertion part 431 may be supported by the supporting ribs 634. Thus, it is possible to prevent loosening of the filter 40 due to its own weight in the state in which the filter 40 is mounted to the head 60 or loosening of the filter 40 when the filter 40 is rotated by a user's manipulation. As the loosening of the filter 40 is prevented as described above, it is possible to prevent water leakage. Further, as the insertion of the filter 40 is guided by the supporting ribs 634, the filter 40 is mounted at an accurate position, so that an operation of connecting flow paths can be more easily performed.

The connecting cap 80 may connect the heads 60 disposed adjacent to each other. Both ends of the connecting cap 80 may be inserted and mounted into the adjacent inlet and outlet parts 611 and 612, respectively. In addition, O-rings 801 (see FIG. 6) may be provided at both ends of the connecting cap 80, respectively. The O-rings 801 allow water leakage not to occur even when the head 60 is rotated in the state in which both the ends of the connecting cap 80 are respectively inserted into the inlet part 611 and the outlet part 612.

Figure 6:
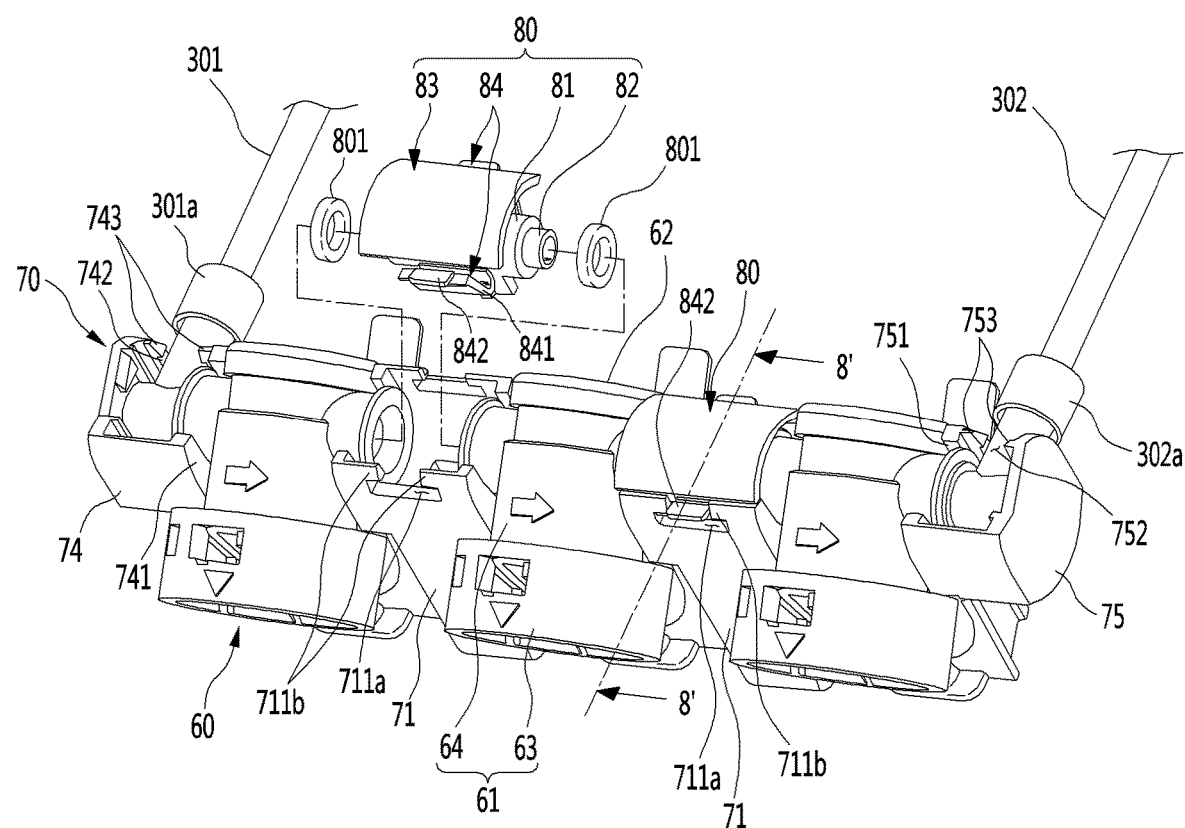
FIG. 6 is an exploded perspective view showing a state in which a connecting cap of the water purifying apparatus is separated, which is viewed from the front.
Figure 7:
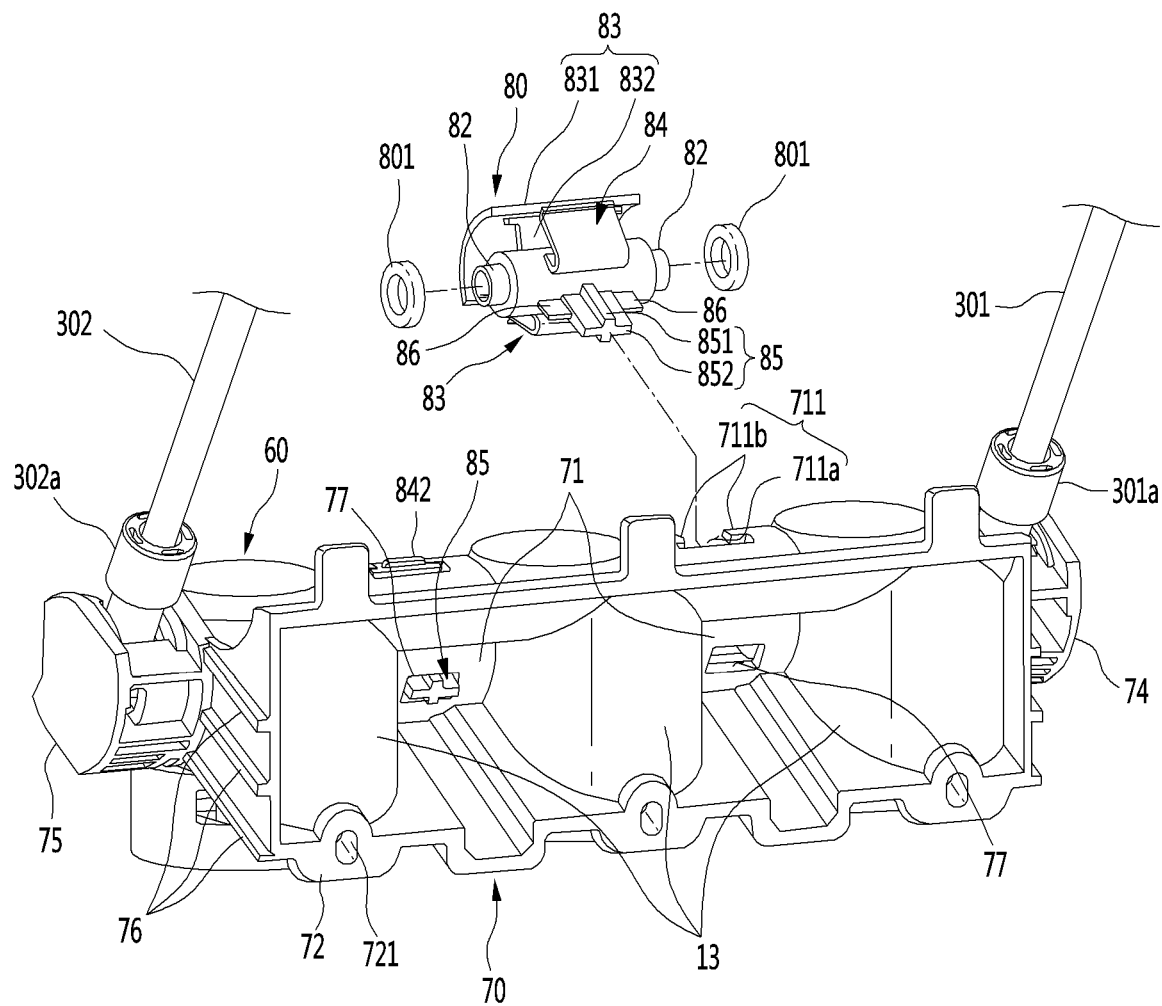
FIG. 7 is an exploded perspective view showing the state in which the connecting cap of the water purifying apparatus is separated, which is viewed from the rear.
Figure 8:
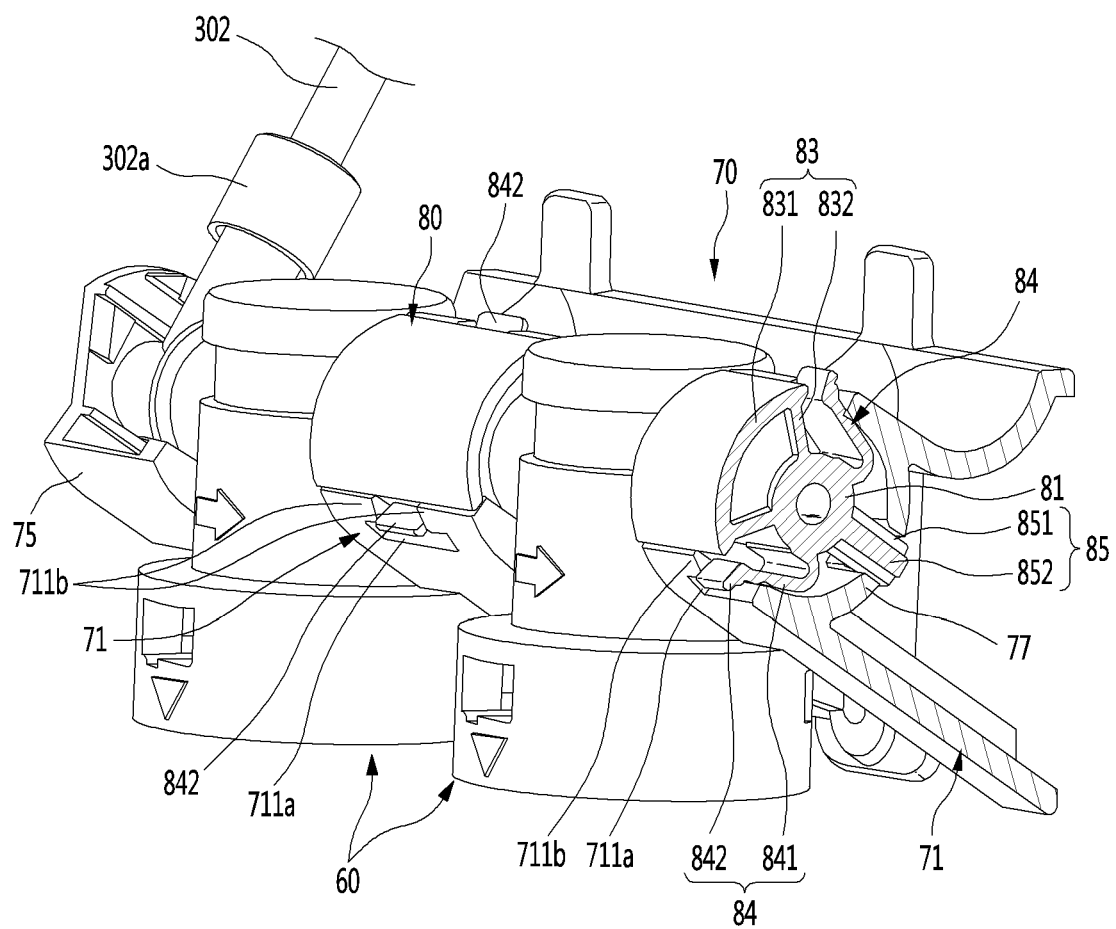
FIG. 8 is a sectional view taken along line 8'-8' of FIG. 6.

FIG. 6 is an exploded perspective view showing a state in which the connecting cap of the water purifying apparatus is separated, which is viewed from the front. FIG. 7 is an exploded perspective view showing the state in which the connecting cap of the water purifying apparatus is separated, which is viewed from the rear. FIG. 8 is a sectional view taken along line 8'-8' of FIG. 6.

As shown in the drawings, both the ends of the connecting cap 80 may be respectively inserted into the inlet and outlet parts 611 and 612 of the head 60, which are disposed at both sides of the connecting cap 80, and the connecting cap 80 may be mounted to the mounting member 70 in the state in which the connecting cap 80 is connected to the head 60. In addition, the connecting cap 80 may be fixedly mounted on the rotation supporting part 71.

The connecting cap 80 may include a flow path part 81, a cover part 83, and restricting parts 84.

In detail, the flow path part 81 constitutes a central portion of the connecting cap 80, and may be formed in a tubular shape having a hollow inside. The flow path part 81 may extend to a length capable of connecting between the inlet part 611 and the outlet part 612, and forms a connecting path between two adjacent heads 60. Both ends of the flow path part 81 may be formed with diameters corresponding to those of the inlet part 611 and the outlet part 612 to be inserted into the inlet part 611 and the outlet part 612, respectively.

The connecting cap 80 may further include stepped parts 82. The stepped parts 82 protrude in the extending direction of the flow path part 81 from both the ends of the flow path part 81, respectively, and are formed to have a diameter smaller than that of the flow path part 81. In addition, the O-ring 801 may be mounted at the circumference of the stepped part 82. In the state in which the O-ring 801 is mounted, both the ends of the flow path part 81 are respectively inserted into the inlet part 611 and the outlet part 612, and the O-rings 801 is respectively in contact with inner surfaces of the inlet part 611 and the outlet part 612, so that it is possible to prevent water leakage when the head 60 and the connecting cap 80 are connected to each other. Further, it is possible to prevent water leakage even in the manipulation of rotating the head 60.

The cover part 83 shields an opened portion of the rotation supporting part 71 and covers portions of the inlet and outlet parts 611 and 612 of the head 60, so that the head 60 is prevented from being separated from the mounting member 70. The cover part 83, for example, may be provided above an outer surface of the flow path part 81.

The cover part 83 may include a shielding plate 831 and a supporter 832 that connects between the shielding plate 831 and the flow path part 81.

The shielding plate 831 may be formed to correspond to the opening shape of the rotation supporting part 71. The shielding plate 831 may be formed entirely rounded. For example, the shielding plate 831 may be formed in an arc shape. The shielding plate 831 not only connects front and rear ends of the rotation supporting part 71 but also allows the inlet part 611 and the outlet part 612 to be rotatable in the state in which they are mounted on the rotation supporting part 71. In addition, portions of the inlet part 611 and the outlet part 612 may be covered by both ends of the shielding plate 831.

The supporter 832 may vertically extend toward an outer surface of the flow path part 81 at front and rear ends of the shielding plate 831. Thus, the shielding plate 831 can maintain a stable supporting state even in a state in which the shielding plate 831 is spaced apart from the flow path plate 81. In addition, the width of the supporter 832 in the length direction of the flow path part 81 may be formed narrower than that of the shielding pate 831 such that the supporter 832 is not interfered by the inlet part 611 and the outlet part 612.

The restricting parts 84 may be provided at former and latter half portions of the outer surface of the flow path part 81, respectively. The restricting part 84 respectively provided at the former and latter half portions of the outer surface of the flow path part 81 merely have different mounting positions and different mounting directions but may have the same shape.

The restricting part 84 may include an elastic part 841 may include an elastic part 841 and a fixing end 842. The elastic part 841 may be formed in a plate shape extending to the outer surface of the flow path part 81. Also, the elastic part 841 may be formed in a shape capable of providing elasticity. That is, the elastic part 841 may be formed in a shape extending downward or outward from the outer surface of the flow path part and then extending to be bent upwardly. Therefore, the extended upper end of the elastic part 841 may be elastically deformed by an external force. When the connecting cap 80 is mounted on the rotation supporting part 71, the elastic part 841 may be pressurized by the elastic deformation.

The fixing end 842 may be formed to protrude outward at the upper end of the elastic part 841. The fixing end 842 may be mounted on the cap fixing part 711 at an upper end of the rotation supporting part 71. In detail, the cap fixing part 711 may include a fixing groove 711a into which the fixing end 842 is inserted, and a pair of fixing projections 711b protruding in opposite directions at an entrance side of the fixing groove 711a.

The distance between the pair of fixing projections 711b may be formed smaller than the width of the fixing end 842. Thus, the fixing end 842 can be restricted by the fixing projections 711b in a state in which the fixing end 842 is press-fitted into the fixing groove 711a.

That is, as shown in FIG. 8, when the connecting cap 80 is mounted to the mounting member 70, the fixing end 842 may be inserted into the fixing groove 711a by passing through the fixing projections 711b due to the elastic deformation of the elastic part 841. In addition, in the state in which the fixing end 842 is inserted into the fixing groove 711a, the fixing end 842 is press-fitted into the fixing groove 711a by a restoring force of the elastic part 841, and maintains the state in which the fixing end 842 is restricted by the fixing projections 711b.

The connecting cap 80 may further include a guide part 85. The guide part 85 may extend outward from a bottom surface of the flow path part 81, which is opposite to the cover part 83. The guide part 85 may extend to pass through the inside of a guide hole 77 formed in a bottom surface of the rotation supporting part 71 from the outer surface of the flow path part 81.

The guide part 85 may include a first rib 851 and a second rib 852, which perpendicularly intersect each other. The section of the guide part 85, for example, may be formed in a cross (+) shape. In this case, widths of the first rib 851 and the second rib 852 may be set such that the first rib 851 and the second rib 852 are in contact with edges of the guide hole 77, respectively. Thus, the guide part 85 can guide the connecting cap 80 to be mounted at a correct position while being in contact with the guide hole 77. That is, if the connecting cap 80 is pushed in the state in which the guide part 85 is inserted into the guide hole 77, the connecting cap 80 can be fixedly mounted on the rotation supporting part 71 in a state in which the connecting cap 80 is aligned. To this end, the guide hole 77 may be opened in a quadrangular shape having lateral and longitudinal sides corresponding to the widths of the first rib 851 and the second rib 852.

In addition, a stopper 86 that connects the outer surface of the flow path part 81 to the second rib 852 may be further formed at a side surface of the second rib 852. The stopper 86 is in contact with an inner surface of the rotation supporting part 71, corresponding to the outer surface of the guide hole 77, to restrict the insertion of the connecting cap 80. The stopper 86 may be formed to a height at which the stopper 86 is in contact with the inner surface of the rotation supporting part 71 in a state in which, as the connecting cap 80 is mounted at the correct position, the outer surface of the cover part 83 shields the rotation supporting part 71.

Hereinafter, an assembly of the water purifying apparatus according to the embodiment having the above-described structure will be described.

Figure 9:
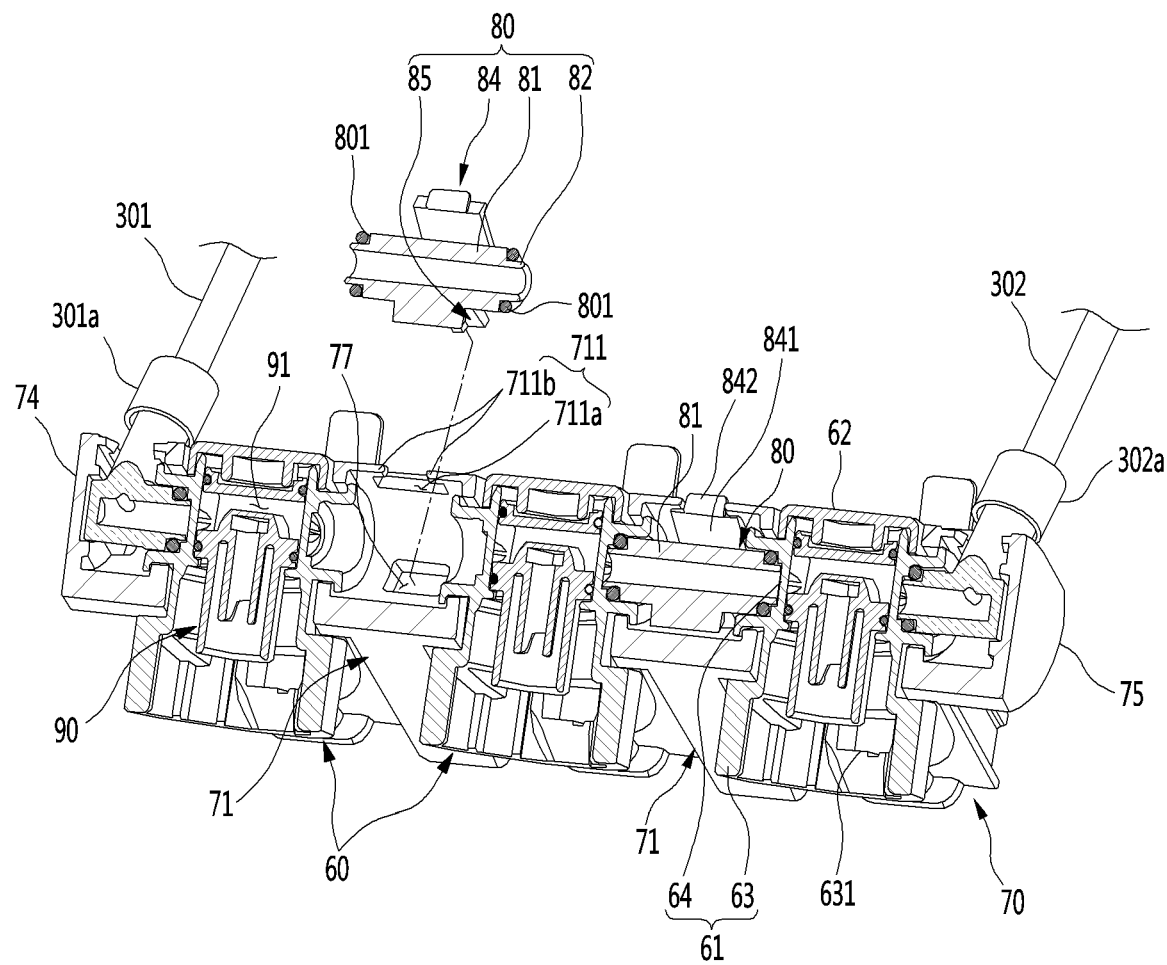
FIG. 9 is a sectional view showing a flow path structure in the state in which the connecting cap of the water purifying apparatus is separated.

FIG. 9 is a sectional view showing a flow path structure in the state in which the connecting cap of the water purifying apparatus is separated.

Referring to FIGS. 5 and 9, in order to mount the water purifying apparatus 17, a plurality of heads 60 are first disposed in parallel. In addition, the inlet tube fitting part 301a and the outlet tube fitting part 302a are inserted into the inlet part 611 and the outlet part 612 of a pair of heads 60 disposed at the outermost sides such that the inlet tube 301 and the outlet tube 302 can communicated with the heads 60, respectively.

In addition, the connecting cap 80 is connected to two adjacent heads 60. At this time, both ends of the flow path part 81 of the connecting cap 80 are inserted into the inlet part 611 of one head 60 and the outlet part 612 of another head 60. As the O-rings 801 are provided to the flow path part 81, the inside of each of the inlet part 611 and the outlet part 612 can be airtight with the flow path part 81, and it is possible to prevent water leakage even in the manipulation of rotating the head 60.

Meanwhile, the head 60 and the connecting cap 80 are mounted to the mounting member 70 in a state in which all of the connecting cap 80 are connected to the plurality of heads 60. At this time, the inlet tube fitting part 301a and the outlet tube fitting part 302a are rotatably mounted to the inlet tube connecting part 74 and the outlet tube connecting part 75, respectively.

The plurality of heads 60 may be accommodated in the inside of the head accommodating part 73. In this process, the inlet and outlet parts 611 and 612 of the head 60 can be naturally mounted on the rotation supporting part 71.

In addition, the guide part 85 may be inserted into the guide hole 77 in the state in which the connecting cap 80 connects the adjacent heads 60. The connecting cap 80 may be mounted on the rotation supporting part 71 in a state in which the connecting cap 80 is aligned as the guide part 85 is in contact with the guide hole 77.

The elastic part 841 may be elastically deformed in the insertion of the connecting cap 80, and the fixing end 842 may be inserted into the fixing groove 711a. At this time, the stopper 86 is in contact with the inner surface of the rotation supporting part 71 such that the connecting cap 80 is no longer inserted.

In this state, the fixing end 842 is restricted at the inside of the fixing groove 711a such that the connecting cap 80 can be fixedly mounted. In addition, the shielding plate 831 of the connecting cap 80 shields the opened top surface of the rotation supporting part 71, to form an external appearance of the top surface of the rotation supporting part 71. In addition, the shielding plate 831 of the connecting cap 80 shields the inlet part 611 and the outlet part 612, so that the head 60 is not separated but can be stably rotated even in the manipulation of rotating the head 60.

Meanwhile, if an assembly of the head unit 50 is completed through the above-described process, a user can insert and mount the filter 40 into the head 60. If the filter 40 is coupled to the head 60 by being completely inserted into the head 60, the flow path of the filter 40 and the internal flow path of the head 60 are connected to each other. Thus, water supplied from the head 60 is introduced into the filter 40 and then purified in the filter 40, and the purified water can be discharged from the filter 40 to the head 60. Further, the purified water can be supplied to the water supply path 30 through the outlet tube 302 by sequentially passing through a plurality of filters 40 connected in parallel.

Figure 10:
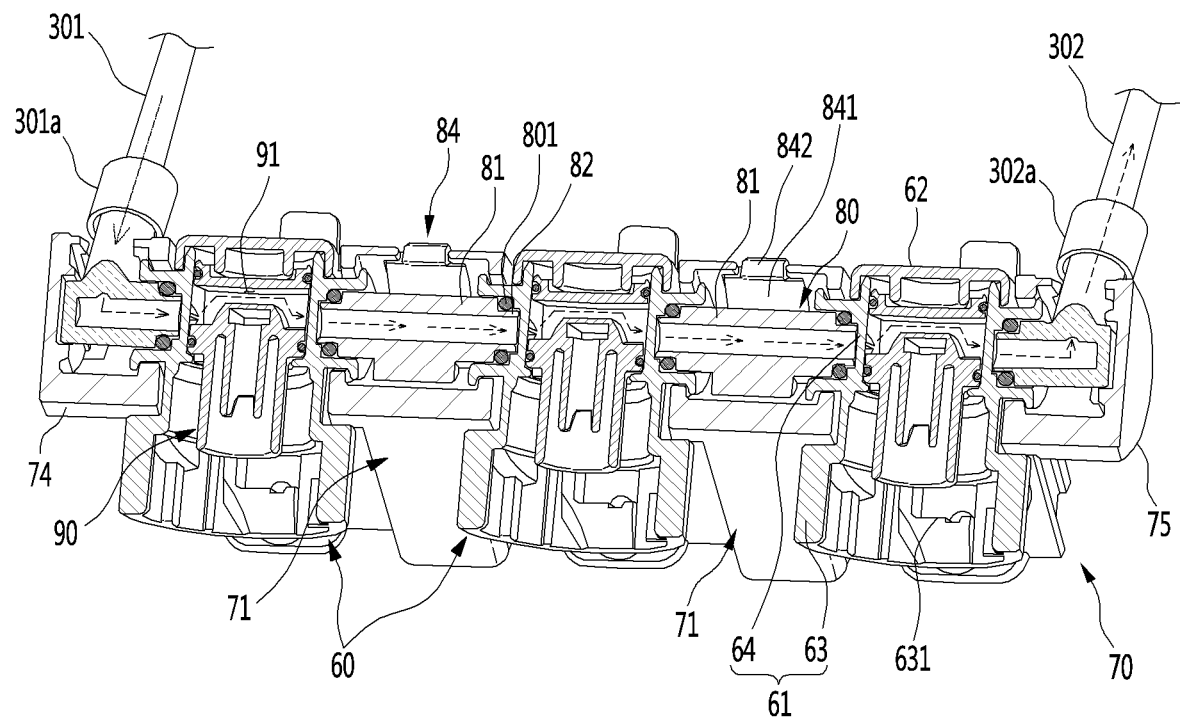
FIG. 10 is a sectional view showing a flow path structure in the state in which the connecting cap of the water purifying apparatus is separated.

FIG. 10 is a sectional view showing a flow path structure in the state in which the connecting cap of the water purifying apparatus is separated.

As shown in the drawing, if the mounting of the mounting member 70 is completed in the state in which the connecting cap 80 is connected to the head 60, all flow paths of the head units 50, along which water flows, are connected to each other.

Particularly, as shown in FIG. 10, in a state in which all of the filters 40 are separated from the heads 60, the bypass flow path 91 in the head 60 may communicate with the flow path part 81 of the connecting cap 80 through the inlet part 611 and the outlet part 612. Thus, water introduced through the inlet tube 301 can flow by crossing the heads 60 through the bypass flow path 91.

Accordingly, water can be continuously supplied even in a situation in which the filter 40 is replaced, a situation in which the water purifying apparatus 17 or the water supply path 30 is maintained and repaired, or a situation in which the filter 40 is removed as a user does not desire a portion or the entire of a water purifying function.

Further, the manipulation of rotating the head 60 is required to perform an operation of replacing the filter 40, and the connecting cap 80 maintains the state in which the connecting cap 80 is coupled to the rotation supporting part 71 even in the manipulation of rotating the filter 40, so that the filter 40 or the head 60 can be prevented from being separated.

Meanwhile, in the embodiment of the present disclosure, the case where the water purifying apparatus 17 is mounted in the refrigerator 1 has been illustrated as an example for convenience and understanding of description. However, the water purifying apparatus 17 may be applied to all apparatuses capable of purifying water using filter exchange methods, including generally used water purifiers.

In the embodiment of the present disclosure, the inlet part and the outlet part are accommodated in the rotation supporting part, and the opening of the rotation supporting part is shielded by the connecting cap. Thus, the inlet part and the outlet part are prevented from being separated from the rotation supporting part.

Accordingly, the head can have a structure capable of being rotated so as to facilitate replacement of the filter. Simultaneously, as the inlet part and the outlet part, which become rotational axes of the head, are covered, the inlet part and the outlet part are prevented from being separated from the rotation supporting part, thereby securing use stability.

In addition, the connecting cap has a structure that connects flow paths of the adjacent heads and enables the head to be fixed. Thus, the connection of flow paths and the rotatable fixation of the head can be performed by one component, so that it is possible to reduce manufacturing cost and improve assembling workability.

Further, when the connecting cap is mounted, the guide part extending in the mounting direction of the connecting cap is inserted into the guide hole of the rotation supporting part, so that the mounting of the connecting cap can be guided, thereby further improving the assembling workability.

In addition, through an operation of connecting both ends of the connecting cap to the inlet and outlet parts of the adjacent heads and mounting the connecting cap on the rotation supporting part in the state in which a plurality of heads are connected to each other, the disposition and fixation of the plurality of heads can be performed, thereby improving productivity.

Although some embodiments of the present disclosure are described for illustrative purposes, it will be apparent to those skilled in the art that various modifications and changes can be made thereto within the scope of the disclosure without departing from the essential features of the disclosure.

Accordingly, the aforementioned embodiments should be construed not to limit the technical spirit of the present disclosure but to be provided for illustrative purposes so that those skilled in the art can fully understand the spirit of the present disclosure.

What is claimed is:

1. A water purifying apparatus comprising:
a plurality of filters purifying and discharging introduced water along flow paths formed therein;
a plurality of heads to which the plurality of filters are individually mounted to be detachable, the plurality of heads each having an inlet part through which water is introduced and an outlet part through which water is discharged;
a mounting member to which the plurality of heads are mounted, the mounting member having a rotation supporting part that rotatably supports each of the plurality of heads; and
a connecting cap mounted on the rotation supporting part to communicably connect the outlet part of a first of the plurality of heads and the inlet part of a second of the plurality of heads,
wherein the rotation supporting part includes a cap fixing part for fixing the connecting cap to the rotation supporting part,
wherein the connecting cap includes:
a flow path part connected to the outlet part of the first of the plurality of heads and the inlet part of the second of the plurality of heads;
a restricting part extending from the flow path part to be elastically deformed, the restricting part being attached to the cap fixing part; and
a cover part extending from the flow path part, the cover part covering the outlet part of the first of the plurality of heads and the inlet part of the second of the plurality of heads in a state in which the restricting part is attached to the cap fixing part.

2. The water purifying apparatus of claim 1, wherein the rotation supporting part further includes a guide hole,
wherein the connecting cap further includes a guide part to pass through the guide hole.

3. The water purifying apparatus of claim 2, wherein the guide part extends at an opposite side of the cover part as the flow path part.

4. The water purifying apparatus of claim 2, wherein the guide part includes a first rib and a second rib intersects the first rib,
wherein an outer end of the first rib and an outer end of the second rib are in contact with an inner surface of the guide hole.

5. The water purifying apparatus of claim 4, wherein the connecting cap further includes a stopper connecting the flow path part to the second rib,
wherein the stopper is in contact with an inner surface of the rotation supporting part, corresponding to an outer surface of the guide hole, to restrict insertion of the connecting cap.

6. The water purifying apparatus of claim 1, wherein stepped parts having a diameter smaller than that of the flow path part are provided at both ends of the flow path part, respectively,
wherein a sealing member is mounted at the circumference of each of the stepped parts.

7. The water purifying apparatus of claim 1, wherein the cover part shields an opened surface of the rotation supporting part, thereby forming an outer surface of the rotation supporting part.

8. The water purifying apparatus of claim 7, wherein the cover part includes a shielding plate that covers the inlet part of the second of the plurality of heads and the outlet part of the first of the plurality of heads, and a supporter that connects the shielding plate to the flow path part.

9. The water purifying apparatus of claim 8, wherein a width of the supporter along a lengthwise direction of the flow path part is less than that of the shielding plate.

10. The water purifying apparatus of claim 8, wherein the shielding plate is formed in an arc shape,
wherein the supporter vertically extends toward an outer surface of the flow path part at both ends of the shielding plate.

11. The water purifying apparatus of claim 1, wherein the restricting part comprises a first restricting part and a second restricting part positioned opposite to the first restricting part.

12. The water purifying apparatus of claim 1, wherein the restricting part includes:
an elastic part extending from the outer surface of the flow path part, the elastic part being bent to have elasticity and then extending to an end portion of the rotation supporting part; and
a fixing end protruding from an end portion of the elastic part,
wherein the cap fixing part includes a fixing groove into which the fixing end is inserted.

13. The water purifying apparatus of claim 12, wherein the cap fixing part further includes a first fixing projection and a second fixing projection positioned opposite to first fixing projection at an entrance of the fixing groove,
wherein a distance between the first and second fixing projections is less than a width of the fixing end.

14. A water purifying apparatus comprising:
a plurality of filters purifying and discharging introduced water along flow paths formed therein;
a plurality of heads to which the plurality of filters are individually mounted to be detachable, the plurality of heads each having an inlet part through which water is introduced and an outlet part through which water is discharged;
a mounting member to which the plurality of heads are mounted in parallel, the mounting member having a rotation supporting part that rotatably supports the plurality of heads, and the rotation supporting part being formed recessed such that the inlet part and the outlet part of each of the plurality of heads are accommodated therein; and
a connecting cap mounted on the rotation supporting part to connect the outlet part of a first of the plurality of heads to the inlet part of a second of the plurality of heads,
wherein the connecting cap includes:
a flow path part connected to the inlet part of the second of the plurality of heads and the outlet part of the first of the plurality of heads; and
a cover part extending from the flow path part, the cover part having a rounded shielding plate that covers the flow path part, and the outlet part of the first of the plurality of heads and the inlet part of the second of the plurality of heads in a state in which the connecting cap is fixed to the rotation supporting part.

15. The water purifying apparatus of claim 14, wherein the cover part further includes a plurality of supporters that connect the shielding plate to the flow path part.

16. The water purifying apparatus of claim 15, wherein a width of the shielding plate in the length direction of the flow path part is formed larger than that of each of the supporters.

17. The water purifying apparatus of claim 14, wherein the connecting cap further includes a restricting part protruding from the flow path part, the restricting part being fixed to the rotation supporting part.

18. The water purifying apparatus of claim 14, wherein the connecting cap further includes a guide part protruding at an opposite side of the cover part from the flow path part, the guide part passing through the rotation supporting part.

19. A refrigerator comprising:
a cabinet forming a storage space;
a door that opens and closes the cabinet;
a water purifying apparatus provided in the storage space, the water purifying apparatus purifying supplied water; and
a dispenser provided at the door to discharge the water purified in the water purifying apparatus,
wherein the water purifying apparatus includes:
a plurality of heads to receive a plurality of filters individually, the plurality of heads each having an inlet part through which water is introduced and an outlet part through which water is discharged;
a mounting member to which the plurality of heads are mounted in parallel, the mounting member having a rotation supporting part that rotatably supports the plurality of heads; and
a connecting cap mounted on the rotation supporting part to connect the inlet part of a second of the plurality of heads to the outlet part of a first of the plurality of heads,
wherein the rotation supporting part includes a cap fixing part for fixing the connecting cap to the rotation supporting part,
wherein the connecting cap includes:
a flow path part connected to the inlet part of the second of the plurality of heads and the outlet part of the first of the plurality of heads;
a restricting part extending from the flow path part to be elastically deformed, the restricting part being fixed to the cap fixing part; and
a cover part extending from the flow path part, the cover part covering the inlet part of the second of the plurality of heads and the outlet part of the first of the plurality of heads in a state in which the restricting part is fixed to the cap fixing part.

20. The refrigerator of claim 19, wherein the rotation supporting part further includes a guide hole,
wherein the connecting cap further includes a guide part passing through the guide hole.

\* \* \* \* \*